United States Patent
Misra et al.

(10) Patent No.: US 11,170,124 B2
(45) Date of Patent: **\*Nov. 9, 2021**

(54) COMPUTER-BASED METHODS AND SYSTEMS FOR MANAGING PRIVATE DATA OF USERS

(71) Applicant: Capital One Services, LLC, McLean, VA (US)

(72) Inventors: Anindya Misra, Arlington, VA (US); Eckow Fred Ayison, McLean, VA (US); Sripal Togaru, McLean, VA (US)

(73) Assignee: Capital One Services, LLC, McLean, VA (US)

( \* ) Notice: Subject to any disclaimer, the term of this patent is extended or adjusted under 35 U.S.C. 154(b) by 14 days.

This patent is subject to a terminal disclaimer.

(21) Appl. No.: 16/870,055

(22) Filed: May 8, 2020

(65) Prior Publication Data

US 2021/0150048 A1 May 20, 2021

Related U.S. Application Data

(63) Continuation of application No. 16/689,388, filed on Nov. 20, 2019, now Pat. No. 10,671,752.

(51) Int. Cl.
| | | |
|---|---|---|
| *G06F 21/60* | (2013.01) | |
| *H04L 29/06* | (2006.01) | |
| *G06F 21/62* | (2013.01) | |
| *G06Q 50/26* | (2012.01) | |
| *G06F 16/23* | (2019.01) | |
| *G06F 16/22* | (2019.01) | |

(52) U.S. Cl.
CPC ...... *G06F 21/6227* (2013.01); *G06F 16/2264* (2019.01); *G06F 16/23* (2019.01); *G06F 21/6245* (2013.01); *G06Q 50/265* (2013.01)

(58) Field of Classification Search
CPC ........... H04L 63/04; G06F 21/60; G06F 21/62
USPC ............. 713/161, 168, 182; 726/1, 2, 27, 28
See application file for complete search history.

(56) References Cited

U.S. PATENT DOCUMENTS

| | | | |
|---|---|---|---|
| 8,370,895 B2 * | 2/2013 | DiCrescenzo | G06Q 10/10 726/1 |
| 2008/0141337 A1 * | 6/2008 | Yeung | H04L 63/102 726/1 |
| 2009/0106815 A1 * | 4/2009 | Brodie | G06F 21/604 726/1 |

\* cited by examiner

*Primary Examiner* — Izunna Okeke
(74) *Attorney, Agent, or Firm* — Greenberg Traurig, LLP

(57) ABSTRACT

A method includes receiving a data capture event affecting personal data of a user stored in at least one storage device of a computing system and mapped in a privacy graph database. Personal data of the user may be identified in the data capture event and classified into the data categories. In response to the data capture event, a mapping of user-centric nodes associated with the at least one user associated with other users in the privacy graph database is automatically updated using the classified personal data in the data capture event. A request by a requester for personal data of at least one specific user stored in the at least one storage device is received. The privacy graph database is queried to provide the requested personal data and locations of the requested personal data of the at least one specific user in the request stored in the computing system.

18 Claims, 12 Drawing Sheets

| Data Category | Data Sub Category | Type |
|---|---|---|
| Name and Contact Information | Name, Phone, Address, Email | Customer & Employee |
| Birth Information | date of birth, place of birth, father/mother | Customer & Employee |
| Government Identifiers | ssn, passport, driver's license | Customer & Employee |
| Online Identifiers & Activity | ip address, cookie, clicks, search, login | Customer & Employee |
| Professional information | degree, school, certification, work history | Employee |
| Location Information | device location, ip address location | Customer & Employee |
| Images and Audio Recordings | cctv, image, call records | Customer & Employee |
| Financial information | Purchase history, Salary, 401k, credit | Customer & Employee |
| Demographics | age, income, family, race, sex | Customer & Employee |
| Health & Wellness | insurance, height, weight | Employee |

FIG. 6

COMPUTER-BASED METHODS AND SYSTEMS FOR MANAGING PRIVATE DATA OF USERS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based methods and systems for managing private data of users.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of:
  receiving, by at least one server in a computing system of an entity, a data capture event affecting personal data of at least one user in the plurality of users stored in at least one storage device of the computing system of the entity and mapped in a privacy graph database;
  wherein the privacy graph database may include a plurality of user-centric nodes and a plurality of edges connecting between the plurality of user-centric nodes representing relationships between the plurality of users;
  wherein each user-centric node may represent only a user from the plurality of users associated with the entity;
  wherein properties of each user-centric node may include personal data of each respective user from the plurality of users classified in data categories and a location of the personal data of each respective user from the plurality of users stored in the at least one storage device of the computing system of the entity;
  identifying, by the at least one server, personal data of the at least one user in the received data capture event;
  classifying, by the at least one server, the personal data of the at least one user in the received data capture event into the data categories;
  automatically updating, by the at least one server, in response to the received data capture event, a mapping of user-centric nodes associated with the at least one user by updating the user-centric nodes and the edges associated with the at least one user from the plurality of users in the privacy graph database using the classified personal data in the received data capture event;
  receiving, by the at least one server, a request by a requester for personal data of at least one specific user from the plurality of users stored in the at least one storage device of the computing system;
  querying, by the at least one server, the privacy graph database to provide the requested personal data and locations of the requested personal data of the at least one specific user in the request stored in the computing system; and
  displaying, by the at least one server, the requested personal data and the locations of the requested personal data of the at least one specific user stored in the computing system to the requester on a display coupled to the at least one server.

In some embodiments, the present disclosure provides an exemplary technically improved computer-based system that includes at least the following components of at least one storage device of an entity and at least one server of the entity. The at least one server of the entity may be configured to:
  receive a data capture event performed by at least one user from a plurality of users affecting personal data of users in the plurality of users stored in a privacy graph database in at least one storage device of the computing system of the entity;
  wherein the privacy graph database may include a plurality of user-centric nodes and a plurality of edges connecting between the plurality of user-centric nodes representing relationships between the plurality of users;
  wherein each user-centric node represents only a user from the plurality of users associated with the entity;
  wherein properties of each user-centric node may include personal data of each respective user from the plurality of users classified in data categories and a location of the personal data of each respective user from the plurality of users stored in the privacy graph database;
  identify personal data of the at least one user in the received data capture event;
  classify the personal data of the at least one user in the received data capture event into the data categories;
  automatically update, in response to the received data capture event, a mapping of user-centric nodes associated with the at least one user and user-centric nodes associated with other users from the plurality of users in the privacy graph database using the classified personal data in the received data capture event;
  wherein the user-centric nodes associated with other users from the plurality of users are connected to the user-centric nodes of the at least one user by edges from the plurality of edges representing relationships in the personal data between the at least one user and the other users from the plurality of users;
  receive a request by a requester for personal data of specific users from the plurality of users stored in the privacy graph database;
  query the privacy graph database to provide the requested personal data and locations of the requested personal data of the specific users in the request stored in the computing system; and
  display the requested personal data and the locations of the requested personal data of the specific users to the requester on a display coupled to the at least one server.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 6 is a table of exemplary data categories and data sub-categories for classifying personal data, in accordance with one or more embodiments of the present disclosure;

DETAILED DESCRIPTION

Figure 1:
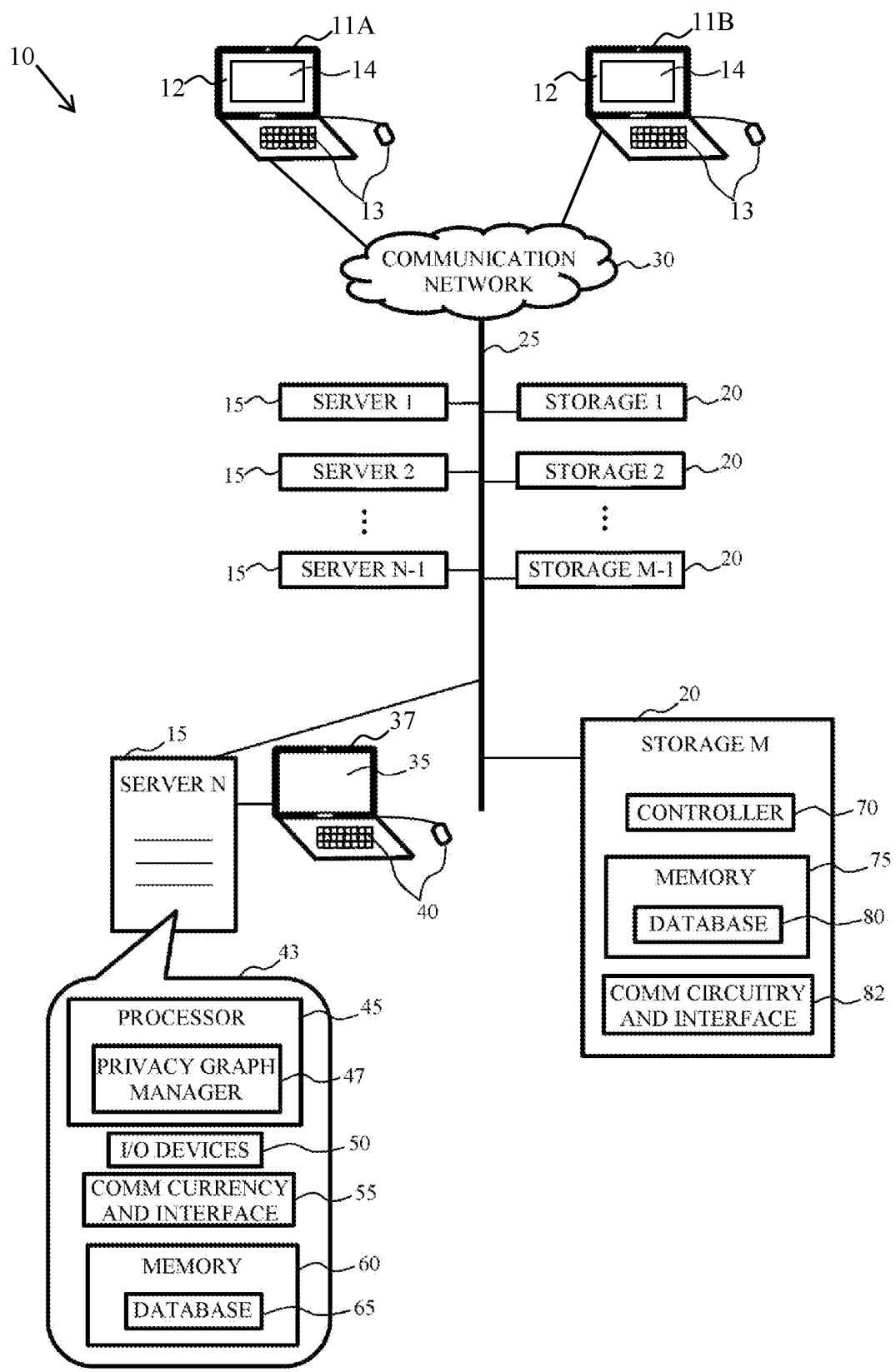
FIG. 1 schematically illustrates a computing system for managing private data of users, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe methods and systems for managing personal data of a plurality of users in a computing system of an entity. A privacy graph database may be used to manage the personal data and storage locations of the personal data of the plurality of users stored in data stores and/or in local databases in storage in the computing system. At least one server in the computing system may receive a data capture event, which may include personal data of a user from the plurality of users for storage that may affect the personal data already stored in the data stores of the computing system.

In response, receiving the data capture event may trigger the computing system to extract the personal data of the user from the data capture event. The system may locally update the privacy graph database associated with the user with the extracted personal data and the updated locations of the personal data of the user extracted from the data capture event without having to refresh or update the entire privacy graph database. The privacy graph database may then be queried to determine the personal data of at least one specified user and the location of the personal data of the at least one specified user in the data stores in the computing system for providing compliance with a number of new data privacy regulations.

The terms private data and personal data may be used herein interchangeably.

FIG. 1 schematically illustrates a computing system 10 for managing private data of users, in accordance with one or more embodiments of the present disclosure. Computing system 10 may be an enterprise network of an entity. The entity may be a financial institution, for example, and the users may be customers and/or employees of the financial institution. Computing system 10 may include a plurality of servers 15 (e.g., N servers) denoted SERVER1, SERVER2, ... SERVERN-1, and SERVERN, where N is an integer. Computing system 10 may also include a plurality of data storage devices 20 (e.g., M storage devices) denoted STORAGE1, STORAGE2, ... STORAGEM-1, and STORAGEM, where M is an integer. Each of the plurality of servers 15 and/or each of the plurality of data storage devices 20 may communicate with each other over a communication network 25 of the entity. Communication network 25 of the entity may be connected to an external communication network 30 such as the internet, for example. A computing system of the entity may refer to the plurality of servers 15 and/or the plurality of data storage devices 20 communicating with each other over a communication network 25 of the entity.

In some embodiments, as shown in an inset 23 of SERVERN, each of the plurality of servers 15 may include a processor 45, input/output (I/O) devices 50 such as a display 35 and a keyboard/mouse 40 coupled to a terminal 37, communication circuitry and interface 55 for communicating over communication network 25 of the entity, and a memory 60 for storing data in data stores and/or a database 65.

In some embodiments, each of the plurality of data storage devices 20 of the entity in computing system 10 may include a controller 70 (e.g., with a processor), communication circuitry and interface 82 for communicating over communication network 25 of the entity, and a memory 75 for storing data stores and/or a database 80. Each of the plurality of servers 15 (e.g., N servers) and/or each of the plurality of data storage devices 20 (e.g., M data storage devices) may include multiple databases such as database 65 and database 80 used in multiple applications and/or functions of the entity in which private data of a plurality of users may be stored therein.

In some embodiments, any data including the private and/or personal data of users may be stored in any data stores located in data storage in any of the plurality of servers 15 and/or any of the plurality of data storage devices 20 in computing system 10 of the entity. A privacy graph or privacy graph database is a representation of a mapping of the data and their location in the data stores and/or data storage devices in the computing system of the entity. Typically, a privacy graph manager 47 may be executed by one of the servers (e.g., one of the processors) in the plurality of servers 15 maintaining the privacy graph database. In some embodiments, processor 45 of SERVERN, for example, may be configured for executing code such as privacy graph manager 47. The personal data of users may be located and stored in any of the local databases such as database 65 and/or database 80 as shown in FIG. 1.

In some embodiments, a plurality of computing devices and/or mobile devices, generically denoted as computing devices 11A and 11B, may communicate with communication network 25 of the entity (e.g., internal to the entity) through an external communication network 30. Each of these plurality of computing devices and/or mobile devices may include input/output devices such as keyboard/mouse 13 and/or a display 14, such as a touch display. Display 14 may include a graphic user interface 12 to display a web page managed by the entity which may be used to send personal data of a user to processor 45 executing privacy graph manager 47 which may trigger a data capture event. Similarly, a display of a mobile device running a mobile application managed by the entity may relay personal data of a user to processor 45 executing privacy graph manager 47 which may trigger a data capture event.

In some embodiments, the data capture event may result in a change in the personal data of a user and/or a change in the location of the personal data of the user stored in the data stores of the entity (e.g., in memory 60 and/or memory 75). For example, a user may enter personal data into various fields in a web form of a web page of the entity displayed on graphic user interface 12. The user may enter the user's date of birth into a Date of Birth field in the web page. This information may be relayed to processor 45 over communication network 25 of the entity and may trigger a data capture event detected by privacy graph manager 47 operating on processor 45, for example. Moreover, the data is already classified as a date of birth. Depending of the application used, the date of birth of the user, if it is a first-time entry, will be stored in a data store for the first time and the location recorded in the privacy graph database. Otherwise (e.g., if not a first-time entry), the date of birth may already be stored in one or more different locations in the data stores and any new locations of the date of birth of the user may be recorded in the privacy graph database.

In some embodiments, the plurality of computing devices and/or mobile devices (e.g., computing devices 11A or 11B) may be configured to monitor a web site that a user visits such as by using clickstream analysis (also called clickstream analytics), for example, which may collect, analyze and/or report data or information about which pages on the website that a user may have visited and in what order. This information may be relayed back to the processor 45 over communication network 25 of the entity. Processor 45 may analyze the received information for personal data, which may have been entered by the user into the web page. This may trigger a data capture event detected by privacy graph manager 47 operating on processor 45, if personal data is found.

In some embodiments, the data capture events are not limited to the plurality of computing devices and/or mobile devices (e.g., computing devices 11A or 11B), but may also be captured on any of the plurality of servers 15 and/or any of the plurality of data storage devices 20 in which personal data may be added and/or updated and/or moved within the data stores of the entity.

In some embodiments, the mobile apps and/or websites operating on the plurality of computing devices and/or mobile devices (e.g., computing devices 11A or 11B) may be configured to search for data capture events in backup data as the backup data from these front end mobile apps and/or websites managed by the entity, that may be periodically relayed to other locations in the plurality of servers 15 and/or the plurality of data storage devices 20 in the entity. However, the identified personal data found in the data capture events may be classified into a plurality of data categories when the identified personal data is not already tagged with different data categories and/or subcategories (e.g., date of birth).

In some embodiments, a plugin inside web folders, inside the data stores and/or databases may be used to monitor for any data capture events which may be then streamed through the privacy graph database.

Figure 2:
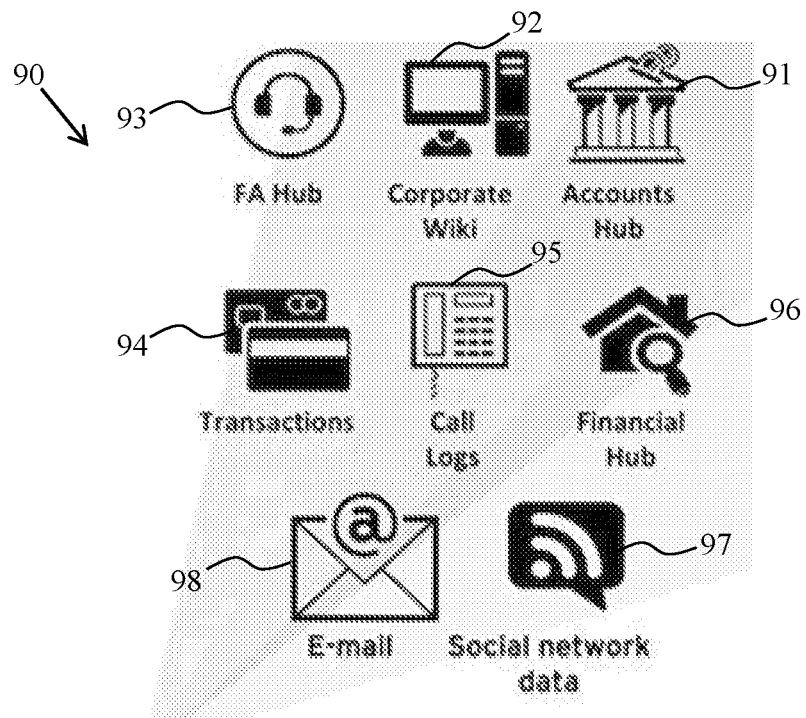
FIG. 2 illustrates data repositories of personal data for a plurality of users in the entity, in accordance with one or more embodiments of the present disclosure.

FIG. 2 illustrates data repositories of personal data for a plurality of users in the entity, in accordance with one or more embodiments of the present disclosure. The data capture events may be triggered in computing system 10 when personal data of the plurality of users may be created in and/or updated in and/or moved between the multiple data sources or data repositories in the entity, such as the personal data of customers and/or employees of a financial institution. Any changed data events in the data stores may be streamed and/or pushed into the privacy graph database (e.g., a push event).

In some embodiments, privacy graph manager 47 may receive an indication of a movement of analytical data in data stores in the computing system (e.g., in the archival system for archiving purposes). Such analytical data may be transformed several times in the archival system and the transformation of the data may be very hard to track.

For example, in a financial institution, a user may apply to the financial institution for a credit card. The initial data capture event may occur on computer 11A as the user applies for the credit card and enters personal data into a web page, triggering privacy graph manager 47 to update the privacy graph database of the financial institution with the user's private personal data stored in a data store. However, as the credit card is created in the financial institution over a period of time later than the initial data capture event, the personal data of the user may be passed to different data stores in the financial institution such as a data store holding encryption keys and/or tokens for authenticating the user that is magnetically stored on the magnetic stripe of the card and/or a different data store linking the credit limit of the newly created credit card to the personal data of the user, for example. Each movement of the user's personal data between data stores in each of these creation steps may result in a data capture event detected by privacy graph manager 47 and triggering an update of the privacy graph database.

In some embodiments, the multiple data sources in the entity may include an account hub 91, corporate wiki 92, financial advisor (FA) hub 93, a transaction data store 94, a call logs data store 95, a financial hub 96, social network data store 97, and an e-mail data store 98. The multiple data stores may be located in any of the memories (e.g., memory 60 and memory 75) in the plurality of servers 15 and/or the plurality of data storage devices 20 in the entity.

Figure 3:
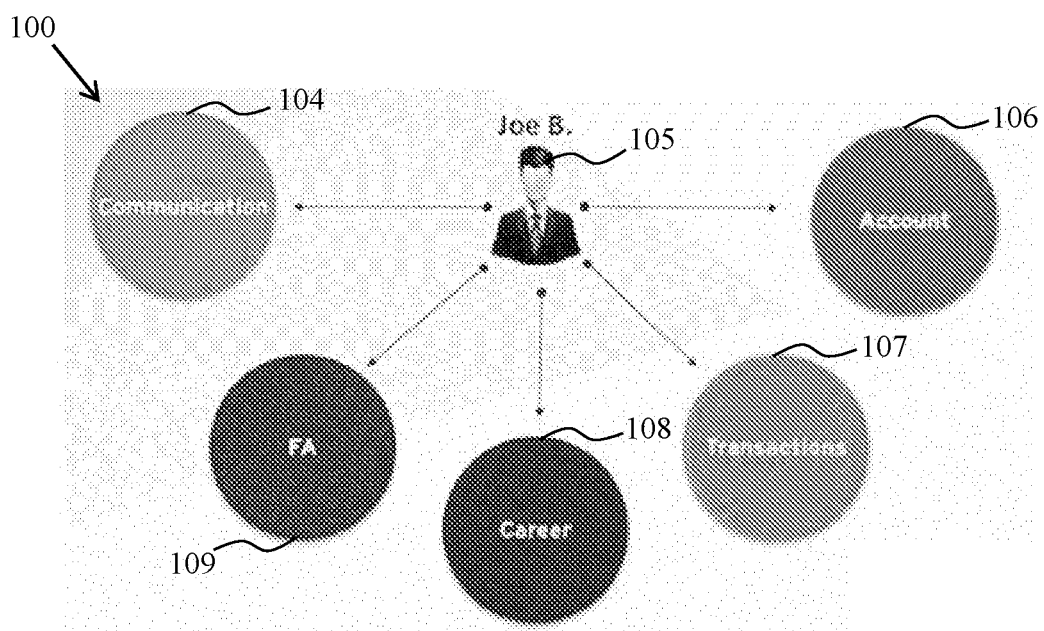
FIG. 3 illustrates a centralized view of a user from the plurality of users in the entity, in accordance with one or more embodiments of the present disclosure.

FIG. 3 illustrates a centralized view 100 of a user 105 from the plurality of users in the entity, in accordance with one or more embodiments of the present disclosure. Centralized view 100 may show exemplary data stores in the computing system of the entity as in FIG. 2 storing personal data about an exemplary user 105 named Joe B. The data stores in the entity storing personal data of user 105 may include account 106, transactions 107, career 108, financial advisor (FA) 109, and communication 104. In some embodiments, centralized view 100 may be part of an output displayed on a display in response to a request for the personal data and the location of the personal data of user 105 stored in multiple data stores 104 and 106-109 in the entity.

Discovering personal data of the plurality of users stored throughout computing system 10 in an entity such as a large enterprise may be a cumbersome process. The personal data may be stored in multiple stores of data with very loose cataloging. The personal data may be duplicated, transformed and enriched in many different use cases making the storage location further difficult to identify. Many new data privacy regulations such as the European General Data Protection Regulation (GDPR) and the California Consumer Privacy Act, for example, may impose fines for violations of managing personal data in companies and/or entities in accordance with the regulations. In addition, personal data queries by a user may also include locating personal data of household and/or family members of the user. Thus, the database may need to be configured to maintain a relationship between the user and family/household members of the user.

Currently, the process of locating personal data in an entity or large enterprise is manual and very cumbersome often using multiple applications over multiple different databases to be queried manually. The embodiments disclosed herein solve this technical problem by use of the privacy graph database, which may also be referred to as a knowledge graph database, resource description framework (RDF) database, or property graph database for automating the process of locating personal data of a plurality of users in the entity by mapping the personal data and their location in the data stores in the entity. Furthermore, the use of the privacy graph database provides a clear view into the status of the personal data as the personal data moves within the enterprise (e.g., moves through any of the plurality of servers 15 and/or any of the plurality of data storage devices 20).

As personal data moves throughout computing system 10 by various applications and/or processes, the privacy graph database may update the new location of the personal data stored in the different stores of data in computing system 10. The privacy graph database maintains a mapping of the source and destination where the personal data is being stored. The privacy graph database may be queried to discover and/or locate personal data of specific users from the plurality of users as well as to delete personal data when requested by a requester. In this manner, the embodiments taught herein may be used by auditors and/or legal representatives used to monitor and/or enforce and/or certify the state of privacy with the entity in accordance with the new data privacy regulations.

A privacy graph database representation, or more generally, a graph database representation may be used to relate personal data items in data stores in the plurality of server and/or the plurality of storage devices (e.g., memory 60 and 75, for example) to a plurality of nodes and edges, where the edges represent relationships between the nodes. The relationships (edges) between the nodes in a privacy graph representation may be used to facilitate a fast retrieval of personal data in the data stores upon querying the privacy graph database. The nodes in the privacy graph database are referred to herein as user-centric nodes in that each node (e.g., the properties of each node) relates only to users of the entity in accordance with the one or more embodiments of the present disclosure.

For example, a head of a household may be related to a spouse, a child, or even a renter all living in the same physical address. The privacy graph database may represent these relationships using user-centric nodes of a head of a household, a spouse, a child, and/or a renter may be connected by edges indicating the relationship to the head of the household. Moreover, if a father (e.g., head of the household) uses a credit card issued by a financial institution and his child also uses his credit card, this information may be captured in a privacy graph database capturing financial relationships between users.

In some embodiments, the user-centric nodes associated with a user may be based on at least the following three attributes: (i) user name (e.g., a person, a company), (ii) user government ID number, (iii) user ID number in the entity (e.g., a customer number, an account number, or an employee number in the entity), which may be used in querying the privacy graph database.

Figure 4A:
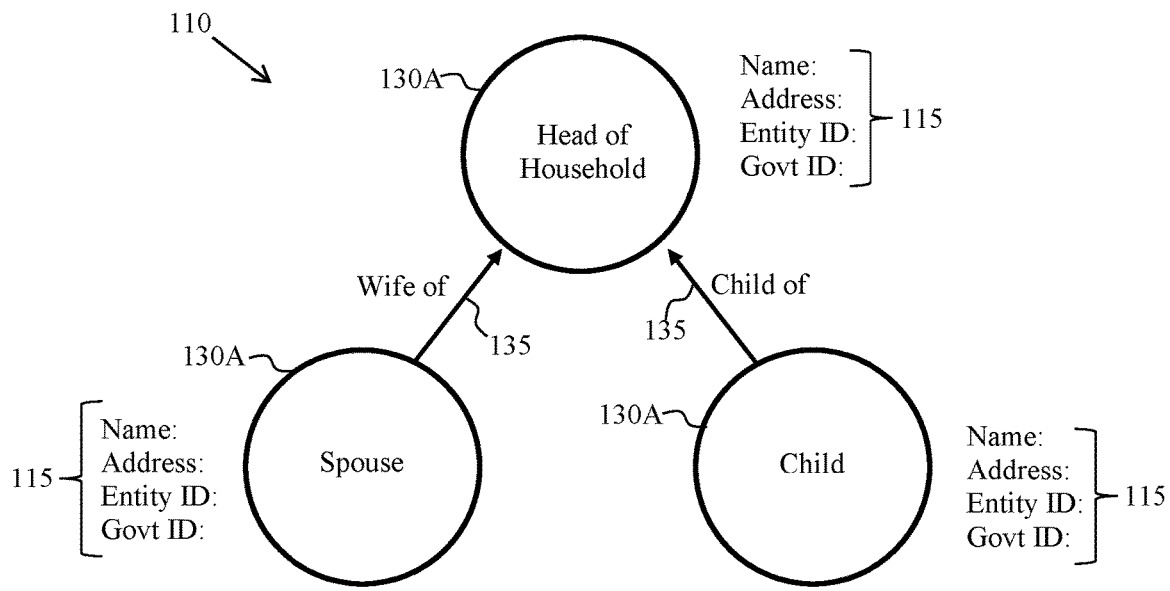
FIGS. 4A-4C are three exemplary embodiments of a privacy graph database, in accordance with one or more embodiments of the present disclosure.
Figure 4B:
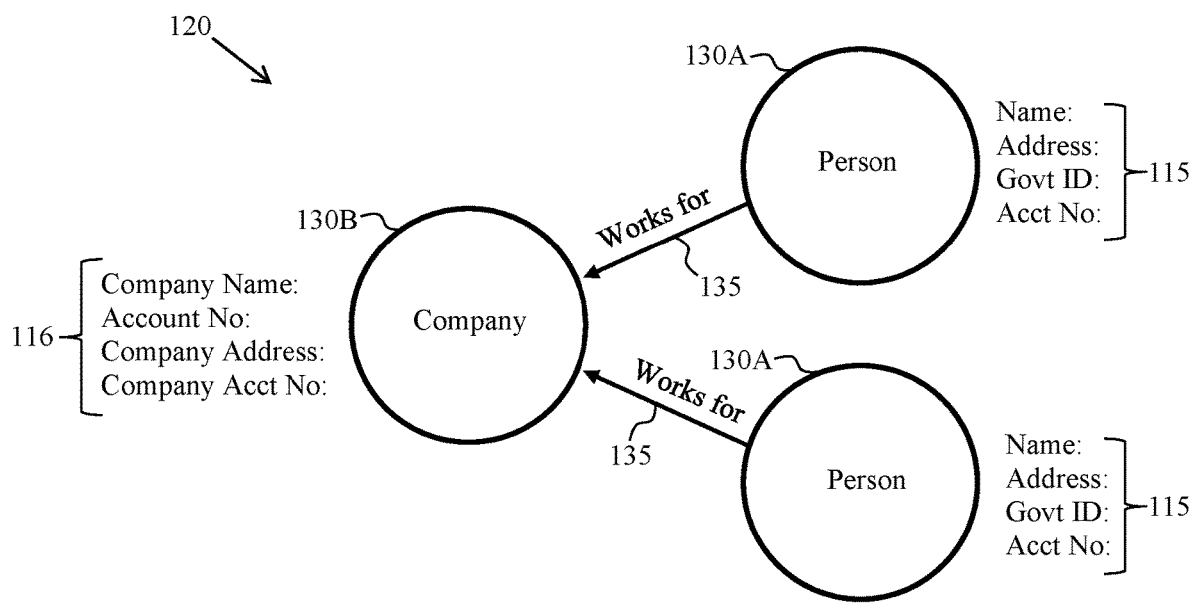
Figure 4C:
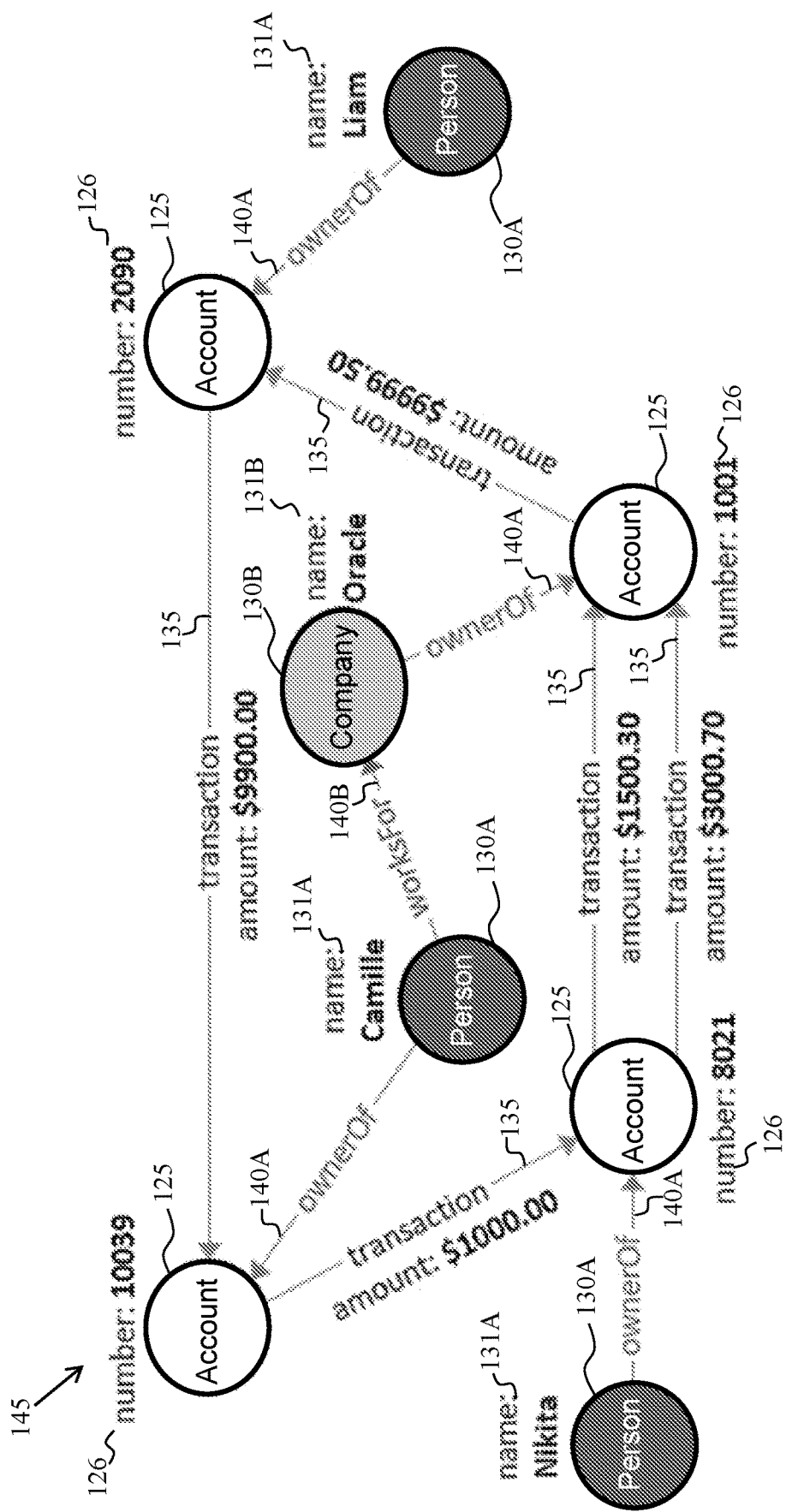

FIGS. 4A-4C are three exemplary embodiments of privacy graph database, in accordance with one or more embodiments of the present disclosure.

FIG. 4A is a first exemplary embodiment of a privacy graph database 110, in accordance with one or more embodiments of the present disclosure. Privacy graph database 110 may represent users as persons in a household scenario, for example. Privacy graph database 110 may include, for example, user centric nodes 130A of persons such as a Head of Household, a spouse, and a child connected by edges 135 denoting the relationship to the Head of Household (e.g., "wife of" or "child of"). Properties 115 of user-centric nodes 130A may include a name, address, entity ID, and government ID, for example.

FIG. 4B is a second exemplary embodiment of a privacy graph database 120, in accordance with one or more embodiments of the present disclosure. Privacy graph database 120 may represent users as both persons and companies in an enterprise scenario (e.g., employer-employee relationship), for example. Privacy graph database 120 may include, for example, person user centric nodes 130A and a company user-centric node 130B connected by edges 135 denoting the relationship to the company (e.g., "works for") such that the person in this case may be an employee of the company. Properties 115 of user-centric nodes 130A of persons may include a name, address, account number, and government ID, for example. Properties of user-centric nodes 130B of a company may include a company name, account number, company address, for example.

FIG. 4C is a third exemplary embodiment of a privacy graph database 145, in accordance with one or more embodiments of the present disclosure. Privacy graph database 145 may include user-centric nodes including account nodes 125, person nodes 130A, and company nodes 130B in another enterprise scenario. Each of these user-centric nodes may include properties of each user-centric node associated with each user represented by the user-centric nodes in privacy graph database 145. These properties may include account numbers 126, a user name 131A, and a company name 131B.

In some embodiments, the user-centric nodes shown in each of the three exemplary embodiments of privacy graph database typically hold many more properties than what is shown in FIGS. 4A-4C. These properties may include the stored personal data of a user and their storage location within the data stores (e.g., data repositories). The personal data of every user (such as a customer and/or an employee and/or a company) may be indexed or tagged inside the user-centric nodes of the privacy graph database along with data categories and/or subcategories.

Relationships between the user-centric nodes shown in privacy graph database 145 may include edges (e.g., the connecting lines and/or arrows between the user-centric nodes). For example, an edge 135 signifying a transaction of amount of $9900, for example, which took place between account user-centric node 125 with account number 10039 and account user-centric node 125 with account number 2090. Edge 140A indicates that Camille is the owner of account 10039 and edge 140B company user-centric node 130B indicates that Camille works for Oracle. In representing a plurality of users in the entity, such as a financial institution, it should be noted that the privacy graph database representation may be much larger than the exemplary embodiments of privacy graph databases shown in FIGS. 4A-4C.

In some embodiments, when initially mapping the privacy graph database, the entity may have initial personal data such as a list of names of users (e.g., customer and/or employee list in a financial institution), driver license numbers, government id number (e.g., social security numbers), for example. Using the initial personal data, processor 45 executing privacy graph manager 47 of any of the plurality of servers 15 may be used to scan and/or parse any databases and/or data stores within computing system 10 of the entity so as to capture any relevant personal data of users in the plurality of users for bootstrapping the privacy graph database.

Once the privacy graph database may be initially constructed and mapped, and the personal data indexed to the storage locations in the plurality of servers 15 and/or the plurality of data storage devices 20 of the entity, any changes to the personal data and/or to their location in the data stores may trigger a data capture event which causes a local remapping of the personal data and its location in the privacy graph database. The local remapping may occur without having to remap the entire database saving large amounts of computing time and/or computing resources in computing system 10.

Figure 5:
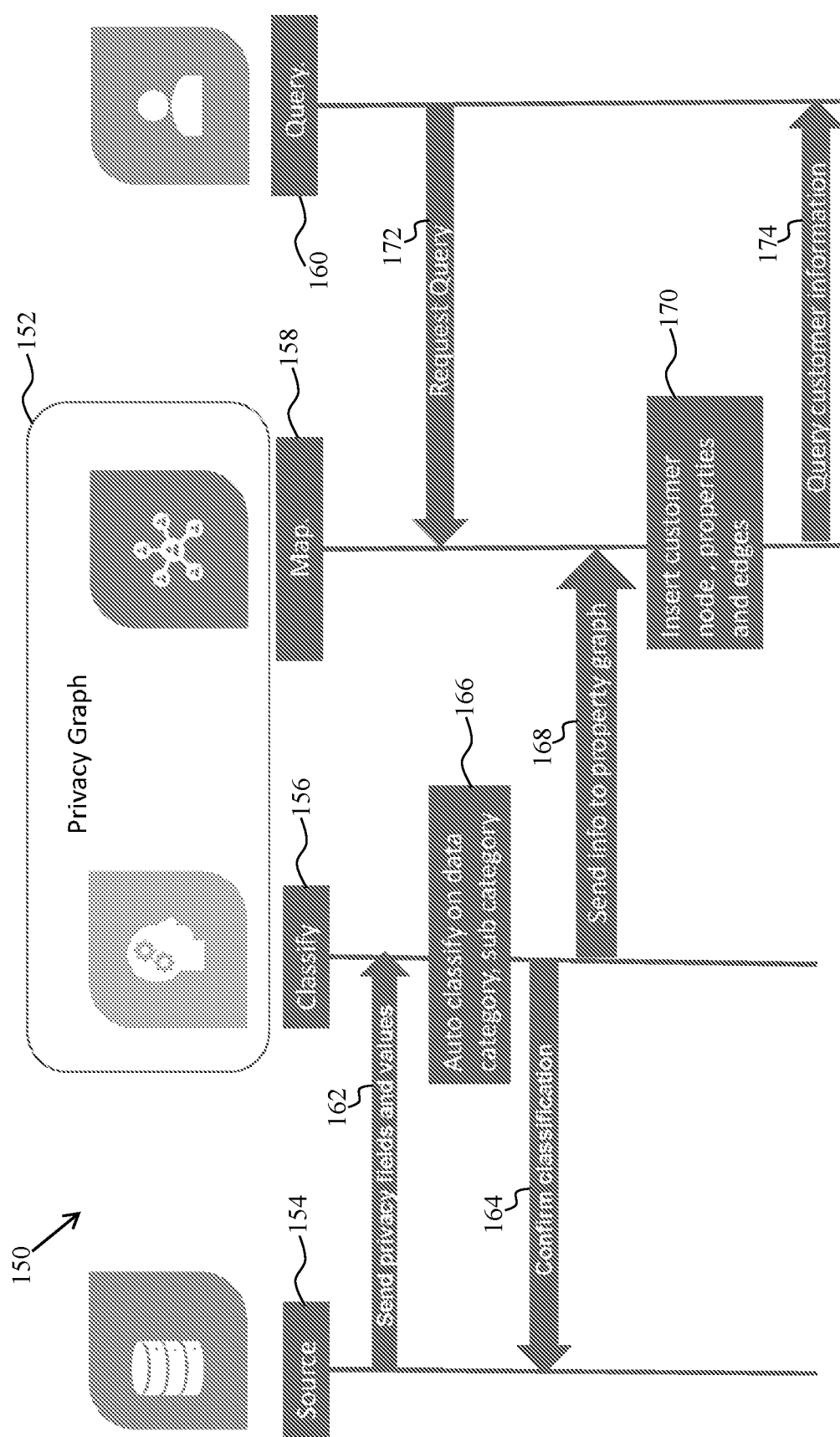
FIG. 5 is a process flow diagram for managing personal data of a plurality of users in a computing system of an entity, in accordance with one or more embodiments of the present disclosure.

FIG. 5 is a process flow diagram 150 for managing personal data of a plurality of users in a computing system of an entity, in accordance with one or more embodiments of the present disclosure. Each of the processes shown in FIG. 5 may be performed by privacy graph manager 47 executed by processor 45 in any of the plurality of servers 15. Processor 45 may detect a data capture event in one of the data sources 154 as shown in FIG. 2, for example. The data capture event may occur, for example, when a user performs actions using a mobile application running on a mobile device and/or a web page operating on computers 11A and 11B as previously described.

In some embodiments, processor 45 executing privacy graph manager 47 may receive privacy fields and values in the data capture event which may be sent 162 from any of the plurality of servers 15 and/or the plurality of data storage devices 20 of the entity managing the data of source 154. Processor 45 may classify 156 the received data in the data capture event from source 154 and may auto classify 166 the personal data of the user identified in the data capture event into data categories and/or data sub-categories. Processor 45 may confirm the data classification with source 154.

In some embodiments, processor 45 may send 168 classified personal data to a privacy graph database 152, which may be also referred to as a property graph. Processor 45 may map 158, or locally remap the classified personal data of the user identified in the data capture event in privacy graph database 152 by inserting 170 and/or editing nodes, properties, and/or edges in privacy graph database 152 with the classified personal data of the user identified in the data capture event.

In some embodiments, processor 45 may receive a request to query 172 privacy graph database 152 from a requester for personal data and the storage location of the personal data in the plurality of servers 15 and/or the plurality of data storage devices 20 of the entity of at least one specified user. Processor 45 may query 160 privacy graph database 152 for the personal data and/or the location of the personal data in the map 158 of the privacy graph database and may send the user query information 174 (e.g., customer query information) to the requester. In other embodiments, the requester may use a predefined graphic user interface (GUI) to request personal data of the at least one specified user and receive a report of the personal data on the GUI.

In some embodiments, processor 45 may query the privacy graph database using a graph query language such as Gremlin or SPARQL.

FIG. 6 is a table 180 of exemplary data categories 182 and data sub-categories 184 for classifying personal data, in accordance with one or more embodiments of the present disclosure. Table 180 displays a column of data categories 182 such as Name and Contact Information, Birth Information, and so forth, and a respective column of data sub-categories 184 for each data category. For example, data sub-categories may include "Name, Phone, Address, Email" for the "Name and Contact Information" data category. Data sub-categories may include "date of birth, place of birth, father/mother" for the "Birth Information" data category, and so forth. Table 180 also includes a column indicating a type 186 of data for each of the data categories such as "Customer & Employee" or "Employee", for example.

In some embodiments, when processor 45 identifies personal data of a user in the data capture event, processor 45 may classify the personal data of the in the data capture event into the data categories and/or subcategories such as shown in table 180 before updating the mapping of the privacy graph database.

In some embodiments, the data capture events may include a series of regular expressions that may include pieces of personal data of a user such as date of birth, or social security number. If the personal data in the regular expressions are already known contextually, such as being obtained from a table in a database, by format (e.g., social security number with format XXX-XX-XXX), or being obtained from fields of a web form where the data categories and/or data sub-categories are known, no classification is needed to tag the personal data with data categories and/or sub-categories as they are already classified. However, if the data capture events include text with personal data that is not tagged to a data category and/or subcategory, processor 45 may search adjacent user centric nodes in the privacy graph database to assess whether the same data is tagged or classified. If found, no category classification may be needed. Otherwise, the personal data may be classified to tag the personal data to data categories and/or subcategories.

Figure 7:
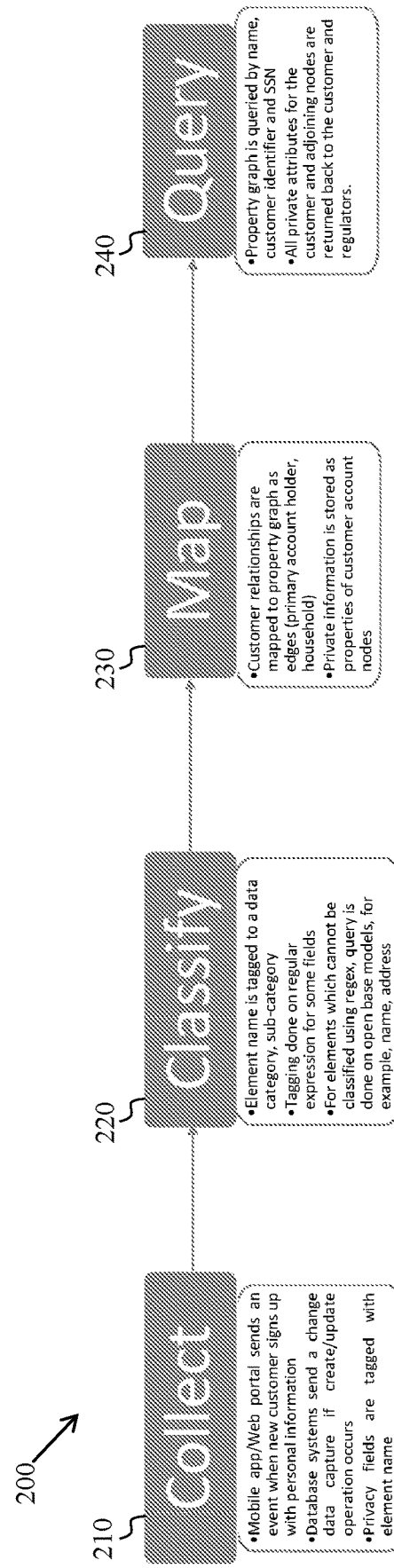
FIG. 7 is a second process flow diagram for managing personal data of a plurality of users in a database of a computing system of an entity, in accordance with one or more embodiments of the present disclosure.

FIG. 7 is a second process flow diagram 200 for managing personal data of a plurality of users in a database of a computing system of an entity, in accordance with one or more embodiments of the present disclosure. Processor 45 executing privacy graph manager 47 may collect 210 personal data in data capture event when: (i) a mobile application or web portal may send an event to the computing system of the entity or financial institution when a new user or customer signs up, and (ii) database systems (e.g., storage in the plurality of servers 15 and/or in the plurality of data storage devices 20 of the entity) send a change data capture event if create/update data operations occur in the data stores (such as in FIG. 2, for example). Privacy fields may be tagged with an element name (e.g., from a data form with predefined data fields on a web page).

Processor 45 may classify 220 the personal data identified in the data capture event by:
(i) An element name may be tagged to a data category and/or data sub-category
(ii) The tagging may be done on regular expressions for some data fields
(iii) For elements that cannot be classified using regular expressions (regex), a query may be performed on open base models, (e.g., name and address).

Processor 45 may query 240 the privacy graph by:
(i) Property graph may be queried by name, customer identification number
(ii) All private attributes of the customer (e.g., privacy data of the user) and adjoining user-concentric nodes may be reported back to the requester (e.g., user, customer, and/or data privacy regulator).

In some embodiments, periodic scans of all data sources in the computing system of the entity may be performed at predefined times or at predefined time intervals to flag data that may not be indexed in the privacy graph database.

Figure 8:
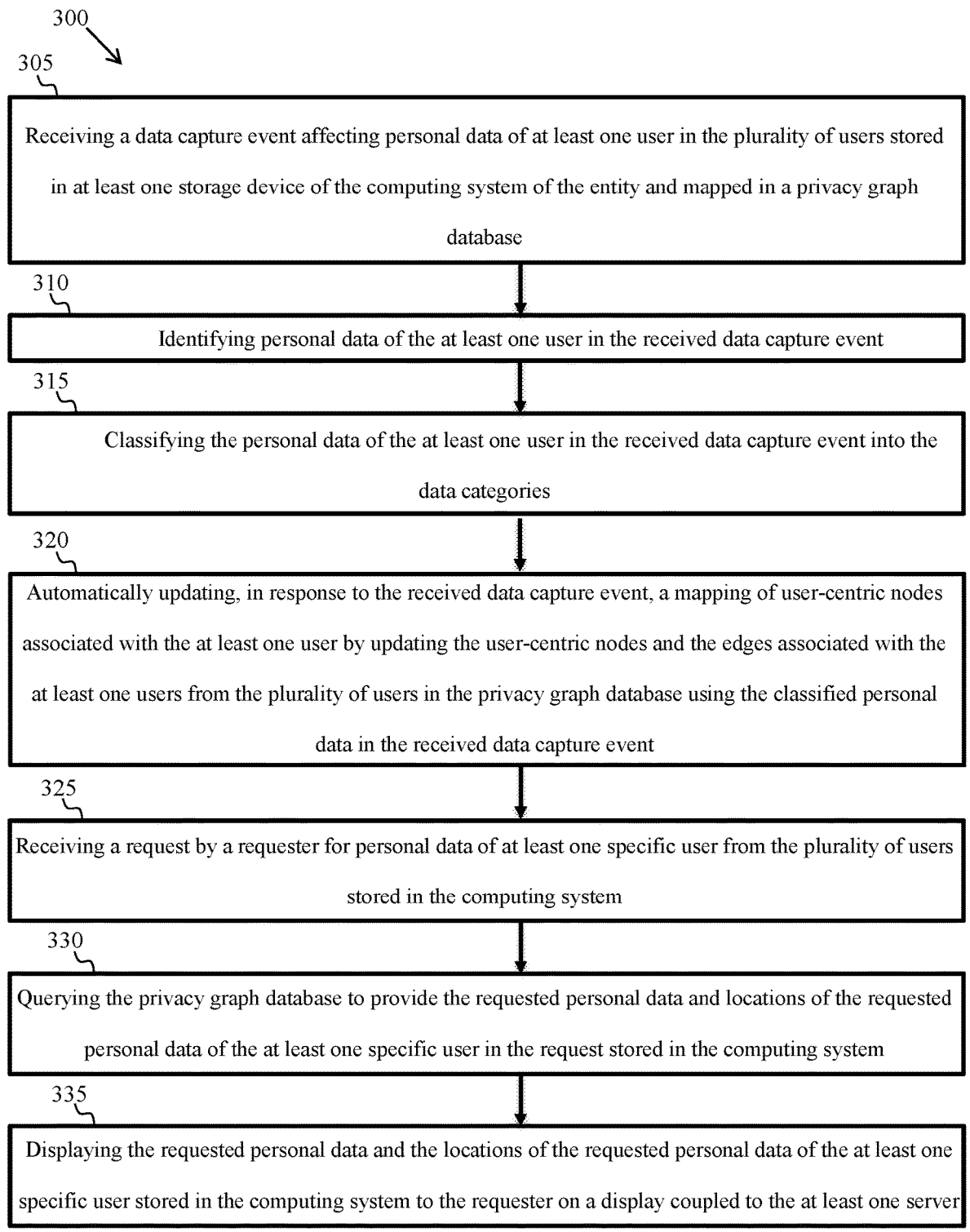
FIG. 8 illustrates a flowchart of a method for managing personal data of a plurality of users in a database of a computing system of an entity, in accordance with one or more embodiments of the present disclosure.

FIG. 8 illustrates a flowchart of a method 300 for managing personal data of a plurality of users in a database of a computing system of an entity, in accordance with one or more embodiments of the present disclosure. Method 300 may be performed by privacy graph manager 47 executed by processor 45 operating at least one server of the plurality of servers 15 of the entity.

Method 300 may include receiving 305 a data capture event affecting personal data of at least one user in the plurality of users stored in at least one storage device of the computing system of the entity and mapped in a privacy graph database. The privacy graph database may include a plurality of user-centric nodes and a plurality of edges connecting between the plurality of user-centric nodes representing relationships between the plurality of users. Each user-centric node may represent only a user from the plurality of users associated with the entity. Properties of each user-centric node may include personal data of each respective user from the plurality of users classified in data categories and a location of the personal data of each respective user from the plurality of users stored in the at least one storage device of the computing system of the entity.

Method 300 may include identifying 310 personal data of the at least one user in the received data capture event. Method 300 may include classifying 315 the personal data of the at least one user in the received data capture event into the data categories.

Method 300 may include automatically updating 320, in response to the received data capture event, a mapping of user-centric nodes associated with the at least one user by updating the user-centric nodes and the edges associated with the at least one user from the plurality of users in the privacy graph database using the classified personal data in the received data capture event.

Method 300 may include receiving 325 a request by a requester for personal data of specific users from the plurality of users stored in the computing system. Method 300 may include querying 330 the privacy graph database to provide the requested personal data and locations of the requested personal data of the at least one specific user in the request stored in the computing system. Method 300 may include displaying 335 the requested personal data and the locations of the requested personal data of the at least one specific user to the requester on a display coupled to the at least one server.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) NET Framework; (36) Silverlight; (37)

Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-99,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, a virtually generated display, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, wearable, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL- POOL, RNGs, etc.). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 9:
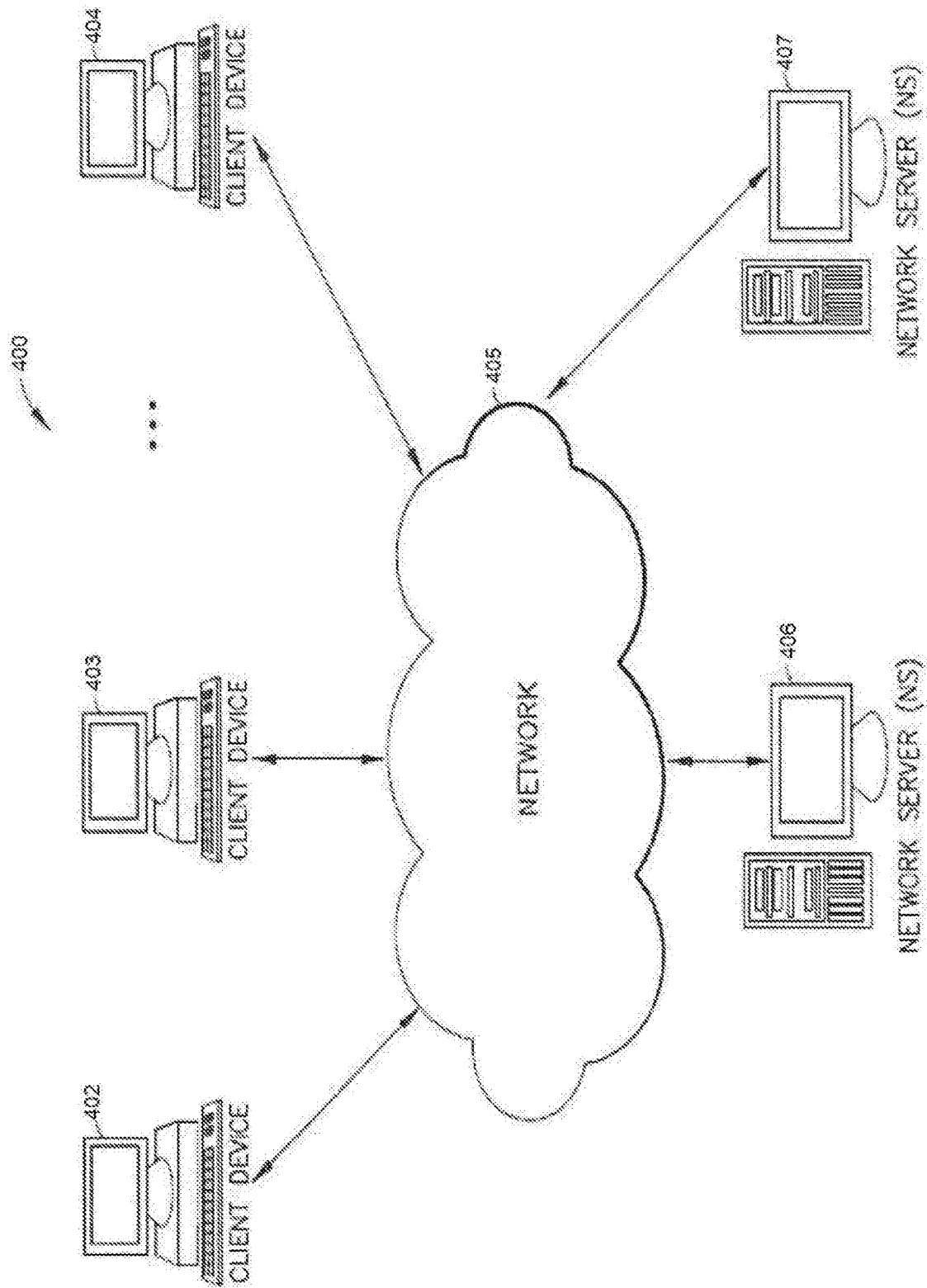
FIG. 9 depicts a block diagram of an exemplary computer-based system/platform in accordance with one or more embodiments of the present disclosure.

FIG. 9 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 9, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 9, in some embodiments, the exemplary server 406 or the exemplary server 407 may have connections to external systems like email, SMS messaging, text messaging, ad content providers, etc.

Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (RC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 10:
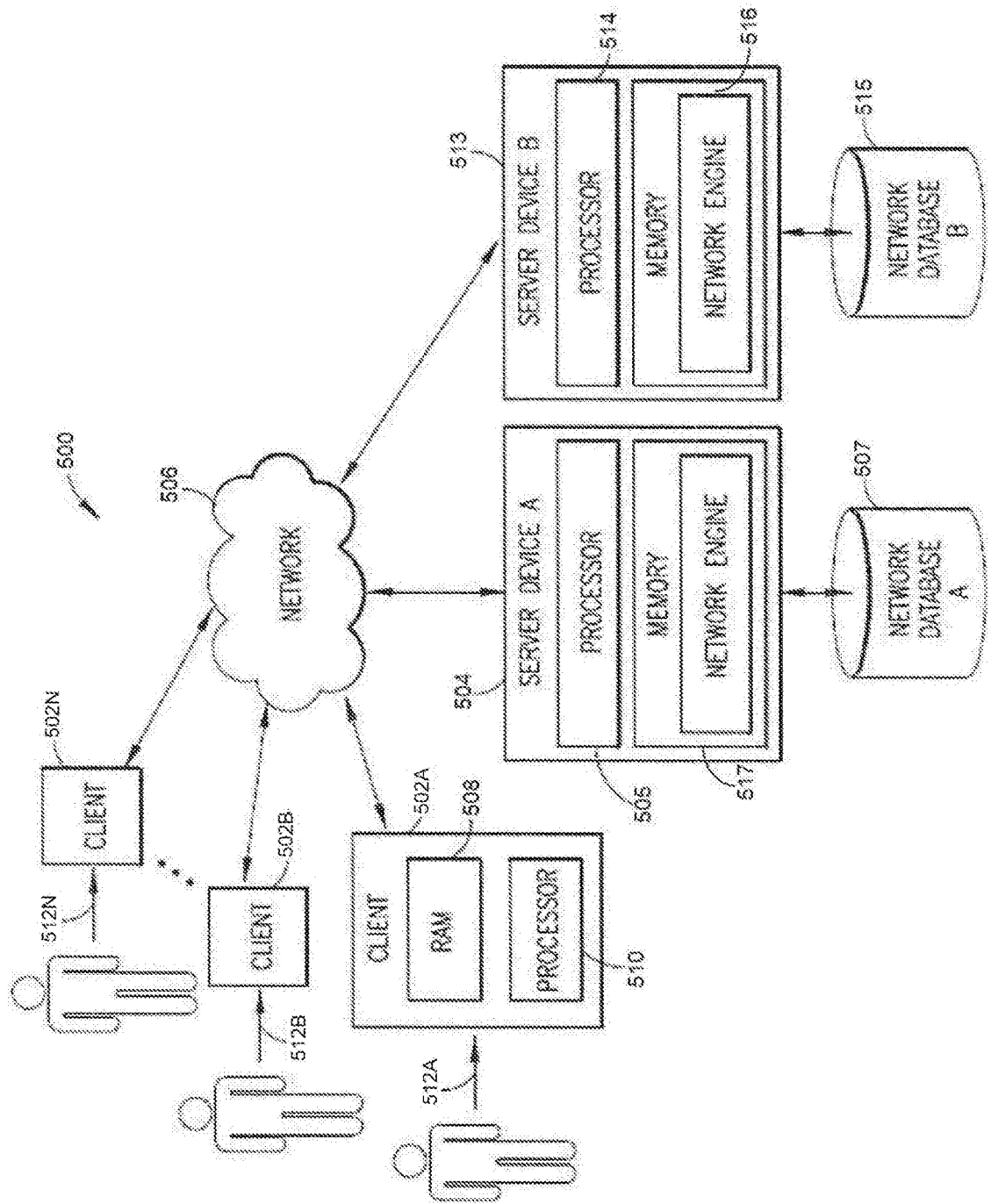
FIG. 10 depicts a block diagram of another exemplary computer-based system/platform in accordance with one or more embodiments of the present disclosure.

FIG. 10 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a-n may also comprise a number of external or internal devices such as a mouse, a CD-ROM, DVD, a physical or virtual keyboard, a display, or other input or output devices.

In some embodiments, examples of member computing devices 502a-n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a-n may be specifically programmed with one or more application programs in accordance with one or more principles/methodologies detailed herein. In some embodiments, member computing devices 502a-n may operate on any operating system capable of supporting a browser or browser-enabled application, such as Microsoft™, Windows™, and/or Linux. In some embodiments, member computing devices 502a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a-n, users, 512a-n, may communicate over the exemplary network 506 with each other and/or with other systems and/or devices coupled to the network 506. As shown in FIG. 10, exemplary server devices 504 and 513 may be also coupled to the network 506. In some embodiments, one or more member computing devices 502a-n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 11:
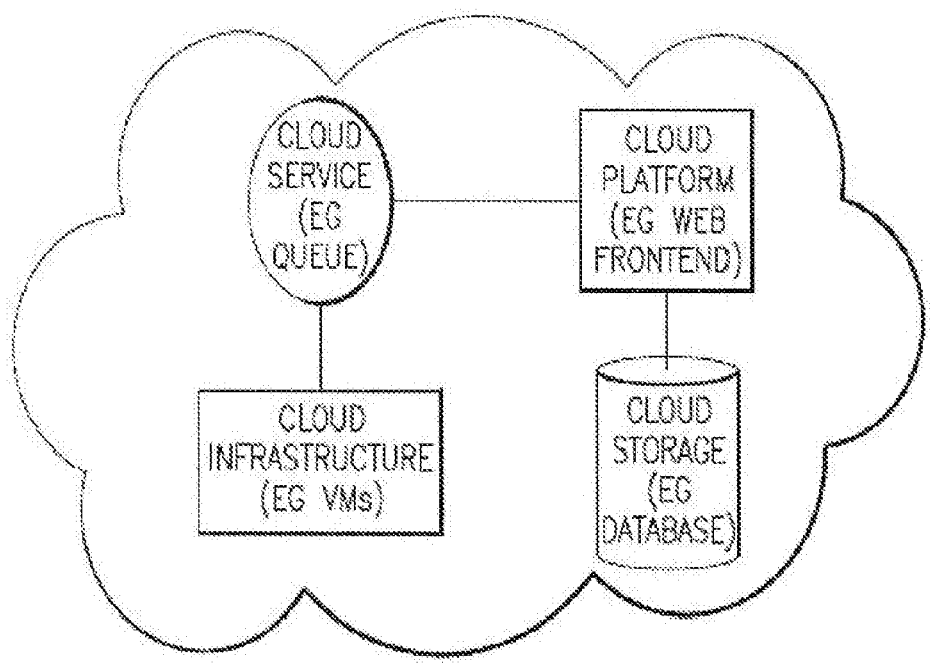
FIGS. 11 and 12 are diagrams illustrating implementations of cloud computing architecture/aspects with respect to which the disclosed technology may be specifically configured to operate, in accordance with one or more embodiments of the present disclosure.
Figure 12:
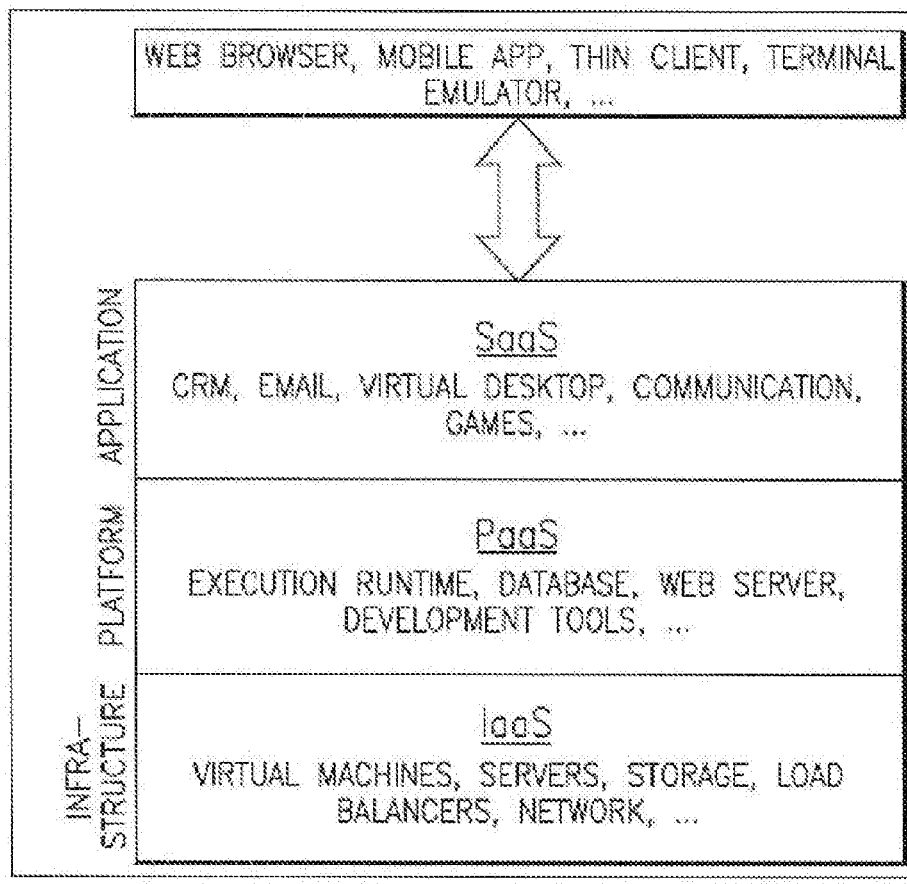

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 11 and 12 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, a method may include:

receiving, by at least one server in a computing system of an entity, a data capture event affecting personal data of at least one user in the plurality of users stored in at least one storage device of the computing system of the entity and mapped in a privacy graph database;

wherein the privacy graph database may include a plurality of user-centric nodes and a plurality of edges connecting between the plurality of user-centric nodes representing relationships between the plurality of users;

wherein each user-centric node may represent only a user from the plurality of users associated with the entity;

wherein properties of each user-centric node may include personal data of each respective user from the plurality of users classified in data categories and a location of the personal data of each respective user from the plurality of users stored in the at least one storage device of the computing system of the entity;

identifying, by the at least one server, personal data of the at least one user in the received data capture event;

classifying, by the at least one server, the personal data of the at least one user in the received data capture event into the data categories;

automatically updating, by the at least one server, in response to the received data capture event, a mapping of user-centric nodes associated with the at least one user by updating the user-centric nodes and the edges associated with the at least one user from the plurality of users in the privacy graph database using the classified personal data in the received data capture event;

receiving, by the at least one server, a request by a requester for personal data of at least one specific user from the plurality of users stored in the at least one storage device of the computing system;

querying, by the at least one server, the privacy graph database to provide the requested personal data and locations of the requested personal data of the at least one specific user in the request stored in the computing system; and displaying, by the at least one server, the requested personal data and the locations of the requested personal data of the at least one specific user stored in the computing system to the requester on a display coupled to the at least one server.

In some embodiments, automatically updating the mapping may include automatically updating the mapping of only the user-centric nodes and the edges associated with the at least one user from the plurality of users in the privacy graph database without updating the mapping of user-centric nodes from the plurality of user-centric nodes of any other users from the plurality of users in the privacy graph database.

In some embodiments, automatically updating the mapping may include adding or updating the user-centric nodes, properties, edges, or any combination thereof associated with the at least one user in the privacy graph database.

In some embodiments, displaying the locations of the requested personal data of the at least one specific user may include displaying a source and a destination of where the requested personal data of the at least one specific user is stored in the computing system.

In some embodiments, the method may include deleting all or a portion of the requested personal data of the at least one specific user in the computing system when requested by the requester.

In some embodiments, receiving the data capture event may include receiving an indication of a movement of analytical data in data stores in the computing system.

In some embodiments, receiving the data capture event may include receiving a data capture event from a mobile application or a web portal coupled to the computing system when a customer registers in the computing system of the entity with personal data in a create or update operation.

In some embodiments, the data capture event may include personal data of the at least one user in one or more fields tagged with an element name, a specific data category from the data categories, a data subcategory, a source, a destination, a database stored thereon, or any combination thereof.

In some embodiments, the properties of each user-centric node may include at least:

(i) a name;

(ii) an identification number in the entity; and (iii) a government identification number.

In some embodiments, querying the privacy graph database to provide the requested personal data and the locations of the requested personal data of the at least one specific user may include querying the privacy graph database using attributes of the at least one specific user selected from the group consisting of a name, an identification number in the entity, and a government identification number.

In some embodiments, a computing system may include at least one storage device of an entity and at least one server of the entity. The at least one server of the entity may be configured to:

receive a data capture event affecting personal data of at least one user in the plurality of users stored in at least one storage device of the computing system of the entity and mapped in a privacy graph database;

wherein the privacy graph database may include a plurality of user-centric nodes and a plurality of edges connecting between the plurality of user-centric nodes representing relationships between the plurality of users;

wherein each user-centric node may represent only a user from the plurality of users associated with the entity;

wherein properties of each user-centric node may include personal data of each respective user from the plurality of users classified in data categories and a location of the personal data of each respective user from the plurality of users stored in the at least one storage device of the computing system of the entity;

identify personal data of the at least one user in the received data capture event;

classify the personal data of the at least one user in the received data capture event into the data categories;

automatically update, in response to the received data capture event, a mapping of user-centric nodes associated with the at least one user by updating the user-centric nodes and the edges associated with the at least one user from the plurality of users in the privacy graph database using the classified personal data in the received data capture event;

receive a request by a requester for personal data of at least one specific user from the plurality of users stored in the at least one storage device of the computing system;

query the privacy graph database to provide the requested personal data and locations of the requested personal data of the at least one specific user in the request stored in the computing system; and display the requested personal data and the locations of the requested personal data of the at least one specific user stored in the computing system to the requester on a display coupled to the at least one server.

In some embodiments, the at least one server of the entity may be configured to automatically update the mapping by automatically updating the mapping of only the user-centric nodes and the edges associated with the at least one user from the plurality of users in the privacy graph database without updating the mapping of user-centric nodes from the plurality of user-centric nodes of any other users from the plurality of users in the privacy graph database.

In some embodiments, the at least one server of the entity may be configured to automatically update the mapping by adding or updating user-centric nodes, properties, edges, or any combination thereof associated with the at least one user in the privacy graph database.

In some embodiments, the at least one server of the entity may be configured to display the locations of the requested personal data of the at least one specific user by displaying a source and a destination of where the requested personal data of the at least one specific user is stored in the computing system.

In some embodiments, the at least one server of the entity may be further configured to delete all or a portion of the requested personal data of the at least one specific user located in the computing system when requested by the requester.

In some embodiments, the at least one server of the entity may be configured to receive the data capture event by receiving an indication of a movement of analytical data in data stores in the computing system.

In some embodiments, the at least one server of the entity may be configured to receive the data capture event by receiving a data capture event from a mobile application or a web portal coupled to the computing system when a customer registers in the computing system of the entity with personal data in a create or update operation.

In some embodiments, the data capture event may include personal data of the at least one user in one or more fields tagged with an element name, a specific data category from the data categories, a data subcategory, a source, a destination, a database stored thereon, or any combination thereof.

In some embodiments, the properties of each user-centric node may include at least:
(i) a name;
(ii) an identification number in the entity; and
(iii) a government identification number.

In some embodiments, the at least one server of the entity may be configured to query the privacy graph database to provide the requested personal data and the locations of the requested personal data of the at least one specific user by querying the privacy graph database using attributes of the at least one specific user selected from the group consisting of a name, an identification number in the entity, and a government identification number.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
receiving, by at least one server in a computing system of an entity, a data capture event affecting personal data of at least one user in the plurality of users stored in at least one storage device of the computing system of the entity and mapped in a privacy graph database, the data capture event based at least in part on an indication of a movement of the personal data of the at least one user in the at least one storage device of the computing system;
wherein the privacy graph database comprises a plurality of user-centric nodes and a plurality of edges connecting between the plurality of user-centric nodes representing relationships between the plurality of users;
wherein each user-centric node represents only a user from the plurality of users associated with the entity;
wherein properties of each user-centric node comprise personal data of each respective user from the plurality of users classified in data categories and a location of the personal data of each respective user from the plurality of users stored in the at least one storage device of the computing system of the entity;
automatically updating, by the at least one server, in response to the received data capture event, a mapping of user-centric nodes associated with the at least one user by updating only the user-centric nodes and the edges associated with the at least one user in the privacy graph database using the classified personal data in the received data capture event without updating the mapping of user-centric nodes from the plurality of user-centric nodes of any other users, not identified in the received data capture event;
receiving, by the at least one server, a request by a requester for personal data of at least one specific user from the plurality of users stored in the at least one storage device of the computing system; and
querying, by the at least one server, the privacy graph database to provide the requested personal data and locations of the requested personal data of the at least one specific user in the request stored in the computing system.

2. The method according to claim 1, wherein automatically updating the mapping comprises adding or updating the user-centric nodes, properties, edges, or any combination thereof associated with the at least one user in the privacy graph database.

3. The method according to claim 1, further comprising deleting all or a portion of the requested personal data of the at least one specific user in the computing system when requested by the requester.

4. The method of claim 1, wherein the data stores in the computing system comprise at least one of:
(i) an account hub;
(ii) a corporate wiki;
(iii) a financial advisor (FA) hub;
(iv) a transaction data store;
(v) a call logs data store;
(vi) a financial hub;
(vii) social network data store; or
(viii) an e-mail data store.

5. The method according to claim 1, wherein receiving the data capture event comprises receiving a data capture event from a mobile application or a web portal coupled to the computing system when a customer registers in the computing system of the entity with personal data in a create or update operation.

6. The method according to claim 1, wherein the data capture event comprises personal data of the at least one user in one or more fields tagged with an element name, a specific data category from the data categories, a data subcategory, a source, a destination, a database stored thereon, or any combination thereof.

7. The method according to claim 1, wherein the properties of each user-centric node comprise at least:
   (i) a name;
   (ii) an identification number in the entity; and
   (iii) a government identification number.

8. The method according to claim 1, wherein querying the privacy graph database to provide the requested personal data and the locations of the requested personal data of the at least one specific user comprises querying the privacy graph database using attributes of the at least one specific user selected from the group consisting of a name, an identification number in the entity, and a government identification number.

9. The method according to claim 1, further comprising using, by the at one server, the requested personal data and locations of the requested personal data of the at least one specific user in the request to monitor that a state of privacy in the entity is in accordance with data privacy regulations.

10. A computing system, comprising:
   at least one storage device of an entity; and
   at least one server of the entity configured to:
   receive a data capture event affecting personal data of at least one user in the plurality of users stored in at least one storage device of the computing system of the entity and mapped in a privacy graph database, the data capture event based at least in part on an indication of a movement of the personal data of the at least one user in the at least one storage device of the computing system;
   wherein the privacy graph database comprises a plurality of user-centric nodes and a plurality of edges connecting between the plurality of user-centric nodes representing relationships between the plurality of users;
   wherein each user-centric node represents only a user from the plurality of users associated with the entity;
   wherein properties of each user-centric node comprise personal data of each respective user from the plurality of users classified in data categories and a location of the personal data of each respective user from the plurality of users stored in the at least one storage device of the computing system of the entity;
   automatically update, in response to the received data capture event, a mapping of user-centric nodes associated with the at least one user by updating only the user-centric nodes and the edges associated with the at least one user in the privacy graph database using the classified personal data in the received data capture event without updating the mapping of user-centric nodes from the plurality of user-centric nodes of any other users, not identified in the received data capture event;
   receive a request by a requester for personal data of at least one specific user from the plurality of users stored in the at least one storage device of the computing system; and
   query the privacy graph database to provide the requested personal data and locations of the requested personal data of the at least one specific user in the request stored in the computing system.

11. The computing system according to claim 10, wherein the at least one server of the entity is configured to automatically update the mapping by adding or updating user-centric nodes, properties, edges, or any combination thereof associated with the at least one user in the privacy graph database.

12. The computing system according to claim 10, wherein the at least one server of the entity is further configured to delete all or a portion of the requested personal data of the at least one specific user located in the computing system when requested by the requester.

13. The computing system according to claim 10, wherein the data stores in the computing system comprise at least one of:
   (i) an account hub;
   (ii) a corporate wiki;
   (iii) a financial advisor (FA) hub;
   (iv) a transaction data store;
   (v) a call logs data store;
   (vi) a financial hub;
   (vii) social network data store; or
   (viii) an e-mail data store.

14. The computing system according to claim 10, wherein the at least one server of the entity is configured to receive the data capture event by receiving a data capture event from a mobile application or a web portal coupled to the computing system when a customer registers in the computing system of the entity with personal data in a create or update operation.

15. The computing system according to claim 10, wherein the data capture event comprises personal data of the at least one user in one or more fields tagged with an element name, a specific data category from the data categories, a data subcategory, a source, a destination, a database stored thereon, or any combination thereof.

16. The computing system according to claim 10, wherein the properties of each user-centric node comprise at least:
   (i) a name;
   (ii) an identification number in the entity; and
   (iii) a government identification number.

17. The computing system according to claim 10, wherein the at least one server of the entity is configured to query the privacy graph database to provide the requested personal data and the locations of the requested personal data of the at least one specific user by querying the privacy graph database using attributes of the at least one specific user selected from the group consisting of a name, an identification number in the entity, and a government identification number.

18. The computing system according to claim 10, wherein the at least one server of the entity is further configured to use the requested personal data and locations of the requested personal data of the at least one specific user in the request to monitor that a state of privacy in the entity is in accordance with data privacy regulations.

* * * * *